US008689318B2

(12) United States Patent
Proudler

(10) Patent No.: US 8,689,318 B2
(45) Date of Patent: Apr. 1, 2014

(54) TRUSTED COMPUTING ENTITIES

(75) Inventor: Graeme John Proudler, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 632 days.

(21) Appl. No.: 12/524,563

(22) PCT Filed: Jan. 21, 2008

(86) PCT No.: PCT/GB2008/050038
§ 371 (c)(1),
(2), (4) Date: Jul. 29, 2009

(87) PCT Pub. No.: WO2008/090374
PCT Pub. Date: Jul. 31, 2008

(65) Prior Publication Data
US 2010/0146295 A1    Jun. 10, 2010

(30) Foreign Application Priority Data

Jan. 26, 2007 (GB) .................................. 0701518.3
Jun. 13, 2007 (GB) .................................. 0711354.1

(51) Int. Cl.
*G06F 17/00* (2006.01)
(52) U.S. Cl.
USPC ............................................................ 726/14
(58) Field of Classification Search
USPC ................................................ 726/14
See application file for complete search history.

(56) References Cited

U.S. PATENT DOCUMENTS

| 5,784,566 | A * | 7/1998 | Viavant et al. ............... 709/229 |
| 7,908,476 | B2 * | 3/2011 | Kandasamy et al. ......... 713/164 |
| 7,986,786 | B2 * | 7/2011 | Ibrahim et al. ............... 380/277 |
| 2002/0023212 | A1 * | 2/2002 | Proudler ....................... 713/164 |
| 2004/0025016 | A1 | 2/2004 | Focke |
| 2004/0111391 | A1 * | 6/2004 | Fujita et al. ..................... 707/1 |
| 2005/0076209 | A1 * | 4/2005 | Proudler ....................... 713/165 |
| 2006/0005015 | A1 * | 1/2006 | Durham et al. ............... 713/164 |
| 2006/0265754 | A1 | 11/2006 | Birrell et al. |
| 2008/0046758 | A1 * | 2/2008 | Cha et al. ...................... 713/189 |
| 2010/0037315 | A1 * | 2/2010 | Seifert et al. .................... 726/22 |

FOREIGN PATENT DOCUMENTS

| GB | 2405232 | 2/2006 |
| GB | 2420432 | 5/2006 |

OTHER PUBLICATIONS

Fong, P., "Access Control by Tracking Shallow Execution History", Security and Privacy 2004, IEEE Symposium on Berkeley, CA, Computer Soc., pp. 43-55 (May 9-12, 2004).

(Continued)

*Primary Examiner* — Tamara T Kyle

(57) ABSTRACT

The present invention relates to trust in computing platforms and the like. In particular, embodiments of the invention provide a trusted computing entity (64), providing an environment comprising one or more of a set or sets of available security algorithms (62), the entity (64) being adapted to operate on data (702), which data has associated security criteria (704), only if the environment meets the associated security criteria.

27 Claims, 13 Drawing Sheets

(56) References Cited

OTHER PUBLICATIONS

Housely, Xerox Special information Systems, "Security Label Framework for the Internet; rfc1457.txt" IETF Standard, Internet Engineering Task Force, IETF, CH, May 1, 1993.
Safford, et al., "Trusted Computing and Open Source" Information Security Technical Report, Elsevier Advanced Technology, vol. 10, No. 2, pp. 74-82 (Jan. 1, 2005).
Sandhu et al., "Lattice Based Access Control Models" Computer, IEEE Service Center, Los Alamitos, CA, vol. 26, No. 11, pp. 9-19 (Nov. 1, 1993).
GB Search Report dated Sep. 20, 2007 issued on GB Patent Application No. 0711354.1 filed Jun. 13, 2007.
European Examination Report; Application No. 08702121.8; Mar. 22, 2010.

* cited by examiner

TRUSTED COMPUTING ENTITIES

FIELD OF THE INVENTION

The invention relates to data which is trusted, in the sense that at least one trusted entity is prepared to vouch for the data. It is particularly, but not exclusively, relevant to computing entities that are adapted to generate and vouch for trusted data.

BACKGROUND OF THE INVENTION

A significant consideration in interaction between computing entities is trust—whether a foreign computing entity will behave in a reliable and predictable manner, or will be (or already is) subject to subversion. Trusted systems which contain a component at least logically protected from subversion have been developed by the companies forming the Trusted Computing Group (TCG). The TCG develops specifications in this area, for example the "TCG TPM Specification" Version 1.2, which is published on the TCG website. The implicitly trusted components of a trusted system enable measurements of a trusted system and are then able to provide these in the form of integrity metrics to appropriate entities wishing to interact with the trusted system. The receiving entities are then able to determine from the consistency of the measured integrity metrics with known or expected values that the trusted system is operating as expected.

Integrity metrics will typically include measurements of the software used by the trusted system. These measurements may, typically in combination, be used to indicate states, or trusted states, of the trusted system. Measurements will typically be recorded in the form of "digests"—results of hashing the measured data using a hashing algorithm to produce a fixed-size result. Such digests may be combined into a "platform configuration register" (PCR) of a trusted component—a trusted component will generally have a plurality of PCRs dedicated to specific purposes. In Trusted Computing Group specifications, mechanisms are also taught for "sealing" data to a particular platform state—this has the result of encrypting the sealed data into an inscrutable "opaque blob", which is typically stored outside of the trusted component in normal memory, containing a value derived at least in part from measurements of software on the platform. The measurements as indicated comprise digests of the software, because digest values will change on any modification to the software. This sealed data may only be recovered if the trusted component measures the current platform state and finds it to be represented by the same value as in the opaque blob.

It will be appreciated that the integrity of recorded data may be dependent on the mechanisms used to protect that data. One such mechanism is the hashing algorithm used to produce digests. Security algorithms, such as hashing algorithms, typically become less effective over time, as heavy use and study generally reveals security vulnerabilities. It would be desirable to find a way to maintain data integrity in trusted systems over time.

SUMMARY OF THE INVENTION

According to a first aspect, the present invention provides a computing entity as set out in claim 1 of the accompanying claims.

According to a second aspect, the present invention provides a method of processing an item of data as set out in claim 25 of the accompanying claims

BRIEF DESCRIPTION OF THE DRAWINGS

Preferred embodiments of the invention will now be described, by way of example only, with reference to the accompanying drawings, of which.

DETAILED DESCRIPTION OF THE INVENTION

Figure 1:
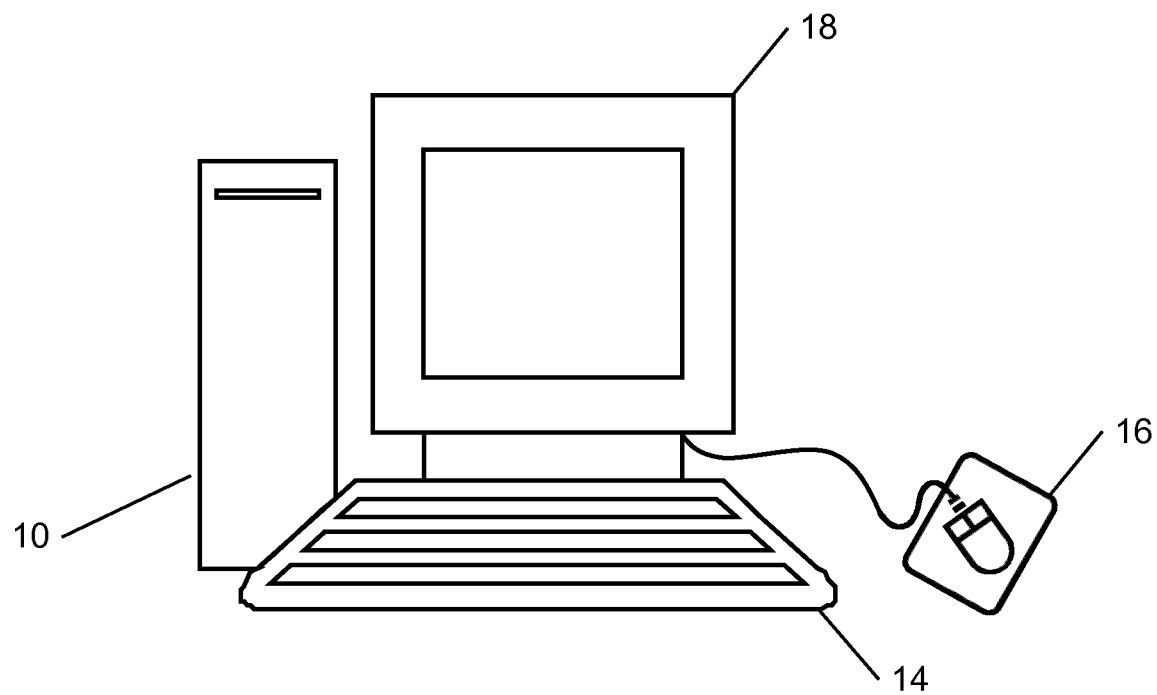
FIG. 1 is an illustration of an exemplary computer platform.
Figure 4:
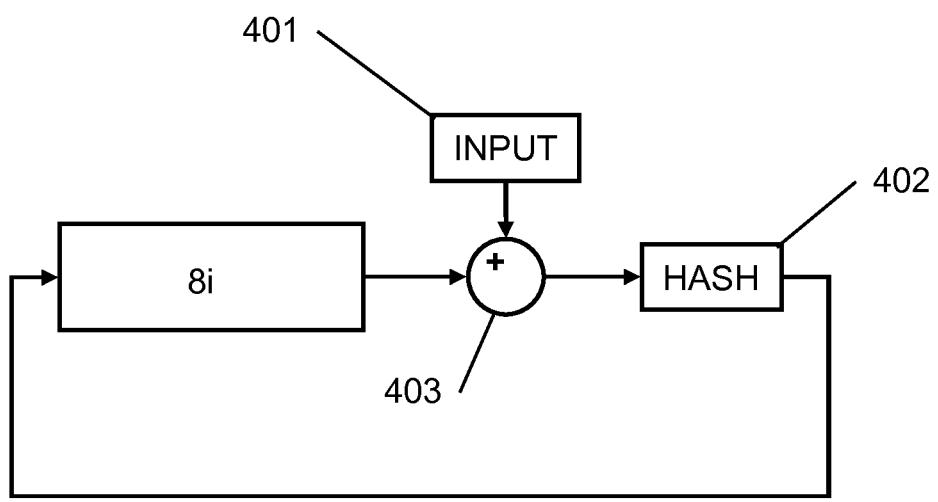
FIG. 4 illustrates the process of extending values into a platform configuration register of the trusted computer platform of FIG. 2.

Before describing embodiments of the present invention, a trusted computing platform of a type generally suitable for carrying out embodiments of the present invention will be described with reference to FIGS. 1 to 5. As used herein, the term "computing platform" is to be understood as encompassing any apparatus capable of effecting computation and is not limited to computers; for example, digital cellular equipment (including mobile telephones) and personal digital assistants (PDAs) have substantial computing capability and are within the scope of the term "computing platform". In addition, the term computing platform herein includes a virtual computing platform environment, which is substantially independent of (e.g. encapsulated or compartmentalised) other such computing environments, which all reside on a common physical computing platform. A practical system that provides this capability is the HP NetTop™ product. To a user, such an environment apparently behaves in exactly the same way as a standalone computing platform, even down to the ability of the user to re-boot the platform: where a re-boot operation of a virtual computing platform re-boots only the resources available to the user in his environment (in other words, a re-boot operation would not have any effect on other users using other virtual computing platforms). In addition, "Trust" as used herein is the expectation that a device will behave in a particular manner for a specific purpose.

This description of a trusted computing platform describes certain basic elements of its construction and operation. A "user", in the present context, may be a local user or a remote user such as a remote computing entity. A trusted computing platform is further described in the applicant's International Patent Application No. PCT/GB00/00528 entitled "Trusted Computing Platform" and filed on 15 Feb. 2000, the contents of which are incorporated by reference herein. The skilled person will appreciate that the present invention does not rely for its operation on use of a trusted computing platform precisely as described below: thus, although embodiments of the present invention are described with respect to a trusted computing platform, the skilled person will appreciate that aspects of the present invention may be employed with different types of computing platform and need not be based on trusted computing platform functionality.

A trusted computing platform (whether physical or virtual) according to embodiments of the present invention provides for trustable platform integrity measurement and reporting and to this end has a plurality of shielded locations, that is, places (memory, register, etc.) where it is safe to operate on sensitive data items, or simply "data". Integrity measurement is the process of obtaining integrity metrics of a platform (that is, metrics of platform characteristics that affect the integrity (trustworthiness of the platform) and putting the metrics (here taken to encompass derivative values such as digests) into shielded locations (in TCG parlance, the shielded locations used for storing integrity metrics are referred to as Platform Configuration Registers or "PCRs" and this terminology will be used hereinafter); integrity reporting is the process of attesting to integrity metrics recorded in PCRs in a way that binds the metrics to the platform concerned. A trusted computing platform may also provide, in addition to shielded locations, trustable storage for securely storing data in encrypted form and for ensuring that access to this data only occurs in a named environment. The foregoing trusted features will normally involve the use of cryptographic functions.

A user can verify the correct operation of a trusted computing platform before exchanging data with the platform by requesting the trusted platform to provide one or more integrity metrics. The user receives the identity metric or metrics, and compares them against values which it believes to be true (these values being provided by a trusted party (TP) that is prepared to vouch for the trustworthiness of the platform or by another party the user is willing to trust). If there is a match, the implication is that at least part of the platform is operating correctly, depending on the scope of the integrity metric.

Once a user has established trusted operation of the platform, he exchanges other data with the platform. For a local user, the exchange might be by interacting with some software application running on the platform. For a remote user (for example, shown as remote platform 60 in FIG. 6), the exchange might involve a secure transaction. In either case, the data exchanged is preferably 'signed' by the trusted platform. The user can then have greater confidence that data is being exchanged with a platform whose behaviour can be trusted. Data exchanged may be information relating to some or all of the software running on the computer platform. Existing Trusted Computing Group trusted computer platforms are adapted to provide digests of software on the platform—these can be compared with publicly available lists of known digests for known software, providing the ability to confirm the integrity of the digests and respective software.

In order to impart to a computing platform the characteristics of a trusted computing platform, it is necessary to provide the platform with certain inherently trustable functionalities (collectively making up what is herein referred to as a "trusted computing entity" or simply a "trusted entity") which operate together with elements of the computing platform to provide the desired trusted characteristics. For trusted platforms following the TCG approach, part of the trusted entity is called a trusted platform module ("TPM") and serves to provide, together with elements of the computing platform to which the trusted entity is physically or logically bound, the following so-called "roots of trust":

a root of trust for measurement (RTM)—the RTM is a computing engine capable of making inherently reliable integrity measurements and is typically the normal platform computing engine (main processor) controlled by a core root of trust for measurement (CRTM), that is the instructions executed by the platform when it acts as the RTM. The CRTM is logically part of the aforesaid trusted entity and would ideally be stored in the TPM but for cost reasons is usually stored in a separate ROM or other form of non volatile memory;

a root of trust for storage (RTS)—the RTS is a computing engine capable of maintaining an accurate summary in PCRs of values of integrity measurement digests; the RTS may also provide for 'protected storage' serving to protect data (frequently keys) held in external storage devices as opaque "blobs" and 'sealed'/'unsealed' for access by the RTS against a particular environment (as indicated by PCR values); and a root of trust for reporting (RTR)—the RTR is a computing engine capable of reliably reporting information held by the RTS.

The trusted entity can be embodied as a hardware device (which may include a program-controlled processor) or in software for execution by a main processor of the platform (in which case it is often referred to as a 'virtual' trusted entity or in the case of a TPM, a virtual TPM). A hardware trusted entity is usually physically bound to the platform with which it is associated whereas a software trusted entity is logically bound to the platform with which it is associated. In practice, virtual trusted entities are usually provided on platforms that have a basic hardware trusted entity for the basic platform environment but further trusted entities are required for virtual environments created on the platform.

It is, of course, also possible to implement a trusted entity as a combination of hardware device and software intended for execution on the platform; where the trustworthiness of the software can be established by a chain of trust rooted in the RTM.

The functionality of the trusted entity can be distributed between multiple devices (in the case of a hardware embodiment) or code blocks (in the case of a 'virtual' embodiment).

The trusted entity uses cryptographic processes but does not necessarily provide an external interface to those cryptographic processes. The trusted entity should be logically protected from other entities—including other parts of the platform of which it is itself a part. Also, a most desirable implementation would be to provide the trusted entity with protective features to protect secrets stored by or being processed by the trusted entity by making them inaccessible to other platform functions and provide an environment that is substantially immune to unauthorised modification For a hardware embodiment, the trusted entity, therefore, preferably consists of one physical component that is tamper-resistant. Techniques relevant to tamper-resistance are well known to those skilled in the art of security. These techniques include methods for resisting tampering (such as appropriate encapsulation of the trusted entity), methods for detecting tampering (such as detection of out of specification voltages, X-rays, or loss of physical integrity in the trusted device casing), and methods for eliminating (or otherwise rendering unusable) data when tampering is detected. As regards a 'virtual' trusted entity, although software may not afford such a high degree of tamper-resistance as a hardware device, this may be compensated for by additional protection measures. For example, the software code may include self-test functions, to check the integrity of the trusted functionality.

A trusted platform 10 is illustrated in the diagram in FIG. 1. The computing platform 10 is entirely conventional in appearance—it has associated the standard features of a keyboard 14, mouse 16 and visual display unit (VDU) 18, which provide the physical 'user interface' of the platform. The present embodiment is described in relation to a so-called personal computer, having operating under a Microsoft™ Windows™ operating system. However, the invention is in no way limited to one particular platform, and other platforms operating under Linux, UNIX™, HP-UX™, Solaris™, or indeed any other operating system, could equally operate according to embodiments of the present invention.

Figure 2:
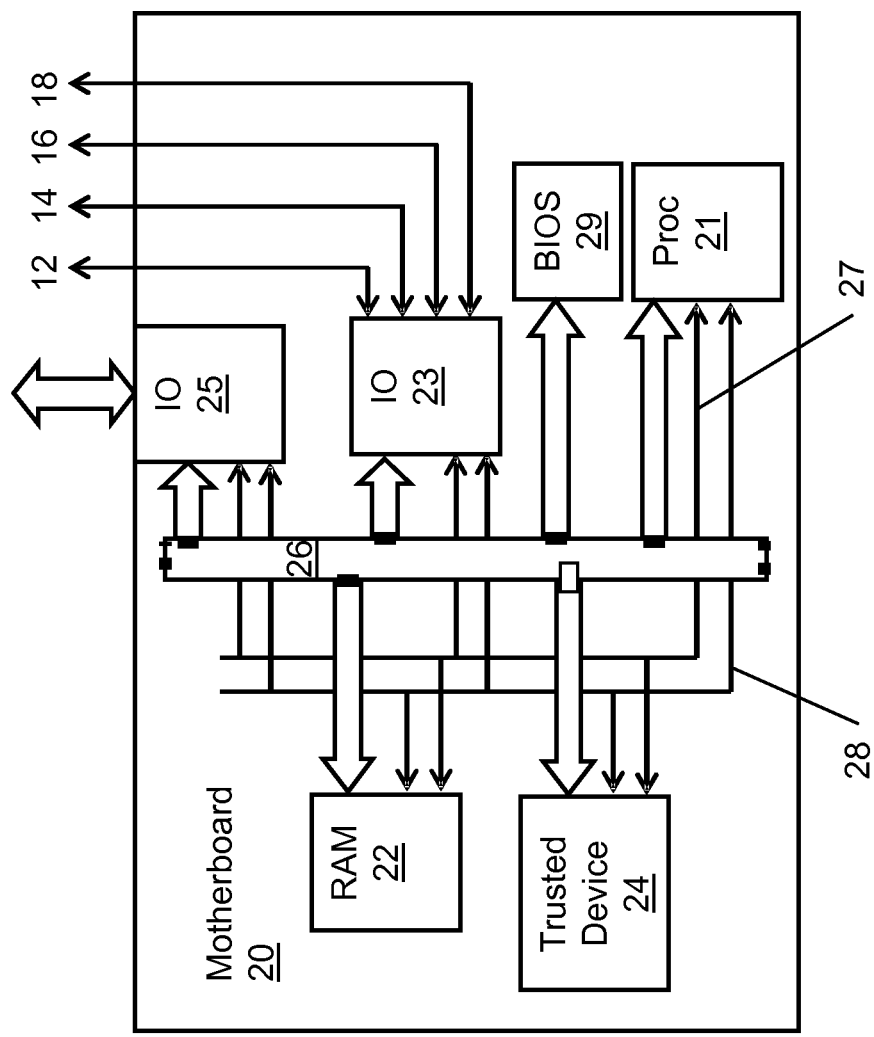
FIG. 2 indicates functional elements present on the motherboard of a trusted computer platform.

As illustrated in FIG. 2, the motherboard 20 of the trusted computing platform 10 includes (among other standard components) a main processor 21, main memory 22, a trusted entity here embodied in the form of trusted device 24 (with at least some characteristics similar to those of a hardware TPM), a data bus 26 and respective control lines 27 and lines 28, BIOS memory 29 containing the BIOS program for the platform 10 and an Input/Output (IO) device 23, which controls interaction between the components of the motherboard and the keyboard 14, the mouse 16 and the VDU 18. The main memory 22 is typically random access memory (RAM). In operation, the platform 10 loads the operating system, for example Windows XP™, into RAM from hard disk (not shown). Additionally, in operation, the platform 10 loads the processes or applications that may be executed by the platform 10 into RAM from hard disk (not shown).

Typically, in a personal computer the BIOS program is located in a special reserved memory area, the upper 64K of the first megabyte of the system memory (addresses F000h to FFFFh), and the main processor is arranged to look at this memory location first, in accordance with an industry wide standard. A significant difference between the platform and a conventional platform is that, after reset, the main processor is initially controlled by the trusted device, which then hands control over to the platform-specific BIOS program, which in turn initialises all input/output devices as normal. After the BIOS program has executed, control is handed over as normal by the BIOS program to an operating system program, such as Windows XP™, which is typically loaded into main memory 212 from a hard disk drive (not shown). The main processor is initially controlled by the trusted device because it is necessary to place trust in the first measurement to be carried out on the trusted platform computing. The code for implementing the measuring agent for this first measurement is the aforesaid core root of trust of measurement (CRTM) and is typically trusted at least in part because its provenance is trusted. As already indicated, the main processor when under control of the CRTM forms the "root of trust for measurement" RTM. As is briefly described below, one role of the RTM is to measure other measuring agents before these measuring agents are used and their measurements relied upon. The RTM is the basis for a chain of trust. Note that the RTM and subsequent measurement agents do not need to verify subsequent measurement agents; they merely measure and record them before they execute. This is called an "authenticated boot process". Valid measurement agents may be recognised by comparing a digest of a measurement agent against a list of digests of valid measurement agents. Unlisted measurement agents will not be recognised, and measurements made by them and subsequent measurement agents are suspect.

Figure 3:
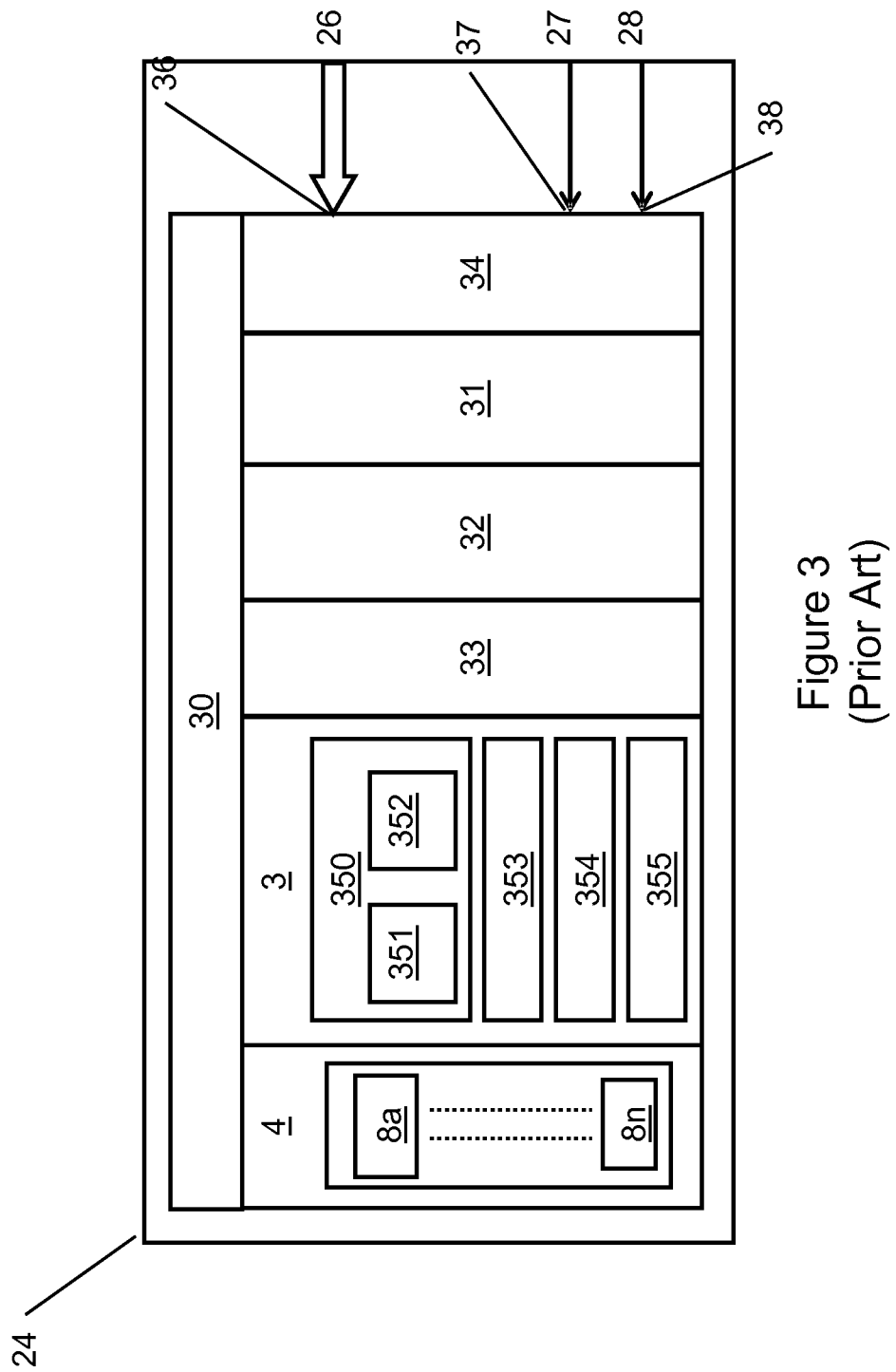
FIG. 3 indicates the functional elements of a trusted device of the trusted computer platform of FIG. 2.

The trusted device 24 comprises a number of blocks, as illustrated in FIG. 3. After system reset, the trusted device 24 performs an authenticated boot process to ensure that the operating state of the platform 10 is recorded in a secure manner. During the authenticated boot process, the trusted device 24 acquires an integrity metric of the computing platform 10. The trusted device 24 can also perform secure data transfer and, for example, authentication between it and a smart card via encryption/decryption and signature/verification. The trusted device 24 can also securely enforce various security control policies, such as locking of the user interface. In a particularly preferred arrangement, the display driver for the computing platform is located within the trusted device 24 with the result that a local user can trust the display of data provided by the trusted device 24 to the display—this is further described in the applicant's International Patent Application No. PCT/GB00/02005, entitled "System for Providing a Trustworthy User Interface" and filed on 25 May 2000, the contents of which are incorporated by reference herein.

Specifically, the trusted device in this embodiment comprises: a controller 30 programmed to control the overall operation of the trusted device 24, and interact with the other functions on the trusted device 24 and with the other devices on the motherboard 20; a measurement function 31 for acquiring a first integrity metric from the platform 10 either via direct measurement or alternatively indirectly via executable instructions to be executed on the platform's main processor; a cryptographic function 32 for hashing, signing, encrypting or decrypting specified data; an authentication function 33 for authenticating a smart card; and interface circuitry 34 having appropriate ports (36, 37 & 38) for connecting the trusted device 24 respectively to the data bus 26, control lines 27 and address lines 28 of the motherboard 20. Each of the blocks in the trusted device 24 has access (typically via the controller 30) to appropriate volatile memory areas 4 and/or non-volatile memory areas 3 of the trusted device 24. Additionally, the trusted device 24 is designed, in a known manner, to be tamper resistant.

For reasons of performance, the trusted device 24 may be implemented as an application specific integrated circuit (ASIC). However, for flexibility, the trusted device 24 is preferably an appropriately programmed micro-controller. Both ASICs and micro-controllers are well known in the art of microelectronics and will not be considered herein in any further detail. As already indicated, at least some functions of a trusted entity may actually be implemented in software.

One item of data that is preferably stored in the non-volatile memory 3 of the trusted device 24 is a certificate 350. The certificate 350 contains at least a public key 351 of the trusted device 24 and an authenticated value 352 of the platform integrity metric measured by a trusted party (TP). The certificate 350 is signed by the TP using the TP's private key prior to it being stored in the trusted device 24. In later communications sessions, a user of the platform 10 can deduce that the public key belongs to a trusted device by verifying the TP's signature on the certificate. Also, a user of the platform 10 can verify the integrity of the platform 10 by comparing the acquired integrity metric with the authentic integrity metric 352. If there is a match, the user can be confident that the platform 10 has not been subverted. Knowledge of the TP's generally-available public key enables simple verification of the certificate 350. The non-volatile memory 35 also contains an identity (ID) label 353. The ID label 353 is a conventional ID label, for example a serial number, that is unique within some context. The ID label 353 is generally used for indexing and labelling of data relevant to the trusted device 24, but is insufficient in itself to prove the identity of the platform 10 under trusted conditions.

The trusted device 24 is equipped with at least one method of reliably measuring or acquiring the integrity metric of the computing platform 10 with which it is associated. In the present embodiment, a first integrity metric is acquired by the measurement function 31 in a process involving the generation of a digest of the BIOS instructions in the BIOS memory. Such an acquired integrity metric, if verified as described above, gives a potential user of the platform 10 a high level of confidence that the platform 10 has not been subverted at a hardware, or BIOS program, level. Other known processes, for example virus checkers, will typically be in place to check that the operating system and application program code has not been subverted.

The measurement function 31 has access to: non-volatile memory 3 for storing a hash program 354 and a private key 355 of the trusted device 24, and volatile memory 4 for storing acquired integrity metrics. A trusted device has limited memory, yet it may be desirable to store information relating to a large number of integrity metric measurements. This is done in trusted computing platforms as described by the Trusted Computing Group by the use of Platform Configuration Registers (PCRs) 8a-8n. The trusted device has a number of PCRs of fixed size (the same size as a digest)—on initialisation of the platform, these are set to a fixed initial value. Integrity metrics are then "extended" into PCRs by a process shown in FIG. 4. The PCR 8i value is concatenated 403 with the input 401 which is the value of the integrity metric to be extended into the PCR. The concatenation is then hashed 402 to form a new 160 bit value. This hash is fed back into the PCR to form its new value. In addition to the extension of the integrity metric into the PCR, to provide a clear history of measurements carried out the measurement process may also be recorded in a conventional log file (which may be simply in main memory of the computer platform). For trust purposes, however, it is the PCR value that will be relied on and not the software log.

Clearly, there are a number of different ways in which an initial integrity metric may be calculated, depending upon the scope of the trust required. The measurement of the BIOS program's integrity provides a fundamental check on the integrity of a platform's underlying processing environment. The integrity metric should be of such a form that it will enable reasoning about the validity of the boot process—the value of the integrity metric can be used to verify whether the platform booted using the correct BIOS. Optionally, individual functional blocks within the BIOS could have their own digest values, with an ensemble BIOS digest being a digest of these individual digests. This enables a policy to state which parts of BIOS operation are critical for an intended purpose, and which are irrelevant (in which case the individual digests must be stored in such a manner that validity of operation under the policy can be established).

Other integrity checks could involve establishing that various other devices, components or apparatus attached to the platform are present and in correct working order. In one example, the BIOS programs associated with a SCSI controller could be verified to ensure communications with peripheral equipment could be trusted. In another example, the integrity of other devices, for example memory devices or co-processors, on the platform could be verified by enacting fixed challenge/response interactions to ensure consistent results. As indicated above, a large number of integrity metrics may be collected by measuring agents directly or indirectly measured by the RTM, and these integrity metrics extended into the PCRs of the trusted device 24. Some—and often many—of these integrity metrics will relate to the software state of the trusted platform.

Preferably, the BIOS boot process includes mechanisms to verify the integrity of the boot process itself. Such mechanisms are already known from, for example, Intel's draft "Wired for Management baseline specification v 2.0—BOOT Integrity Service", and involve calculating digests of software or firmware before loading that software or firmware. Such a computed digest is compared with a value stored in a certificate provided by a trusted entity, whose public key is known to the BIOS. The software/firmware is then loaded only if the computed value matches the expected value from the certificate, and the certificate has been proven valid by use of the trusted entity's public key. Otherwise, an appropriate exception handling routine is invoked. Optionally, after receiving the computed BIOS digest, the trusted device 24 may inspect the proper value of the BIOS digest in the certificate and not pass control to the BIOS if the computed digest does not match the proper value—an appropriate exception handling routine may be invoked.

Processes of trusted computing platform manufacture and verification by a third party are briefly described, but are not of fundamental significance to the present invention and are discussed in more detail in, for example, "Trusted Computing Platforms—TCPA Technology in Context", edited by Siani Pearson, 2003, Prentice Hall PTR.

At the first instance (which may be on manufacture), a TP which vouches for trusted platforms, will inspect the type of the platform to decide whether to vouch for it or not. The TP will sign a certificate related to the trusted device identity and to the results of inspection—this is then written to the trusted device.

At some later point during operation of the platform, for example when it is switched on or reset to begin a new operating cycle, the trusted device 24 acquires and stores the integrity metrics of the platform. When a user wishes to communicate with the platform, he uses a challenge/response routine to challenge the trusted device 24 (the operating system of the platform, or an appropriate software application, is arranged to recognise the challenge and pass it to the trusted device 24, typically via a BIOS-type call, in an appropriate fashion). The trusted device 24 receives the challenge and creates an appropriate response based on the measured integrity metric or metrics—this may be provided with the certificate and signed. This provides sufficient information to allow verification by the user.

Values held by the PCRs may be used as an indication of trusted platform state. Different PCRs may be assigned specific purposes (this is done, for example, in Trusted Computing Group specifications). A trusted device may be requested to provide values for some or all of its PCRs (in practice a digest of these values—by a TPM_Quote command) and sign these values. As indicated above, data (typically keys or passwords) may be sealed (by a TPM_Seal command) against a digest of the values of some or all the PCRs into an opaque blob. This is to ensure that the sealed data can only be used if the platform is in the (trusted) state represented by the PCRs. The corresponding TPM_Unseal command performs the same digest on the current values of the PCRs. If the new digest is not the same as the digest in the opaque blob, then the user cannot recover the data by the TPM_Unseal command. If any of the measurements from which the PCR values are derived relate to software on the platform which has changed, then the corresponding PCR will have a different value—a conventional trusted platform will therefore not be able to recover the sealed data.

As previously indicated, measurements when taken are then recorded as digests, by means of a hashing algorithm operating on the measured data. As described above with reference to FIG. 4, digests can be "extended" into a PCR by further use of the hashing algorithm. The hash function at the heart of the main hashing algorithm used in initial TCG specifications is SHA-1, which produces a 160-bit digest. SHA-1 was provided by the National Security Agency of the USA and has been published as a standard by the National Institute of Standards and Technology (NIST).

Figure 5:
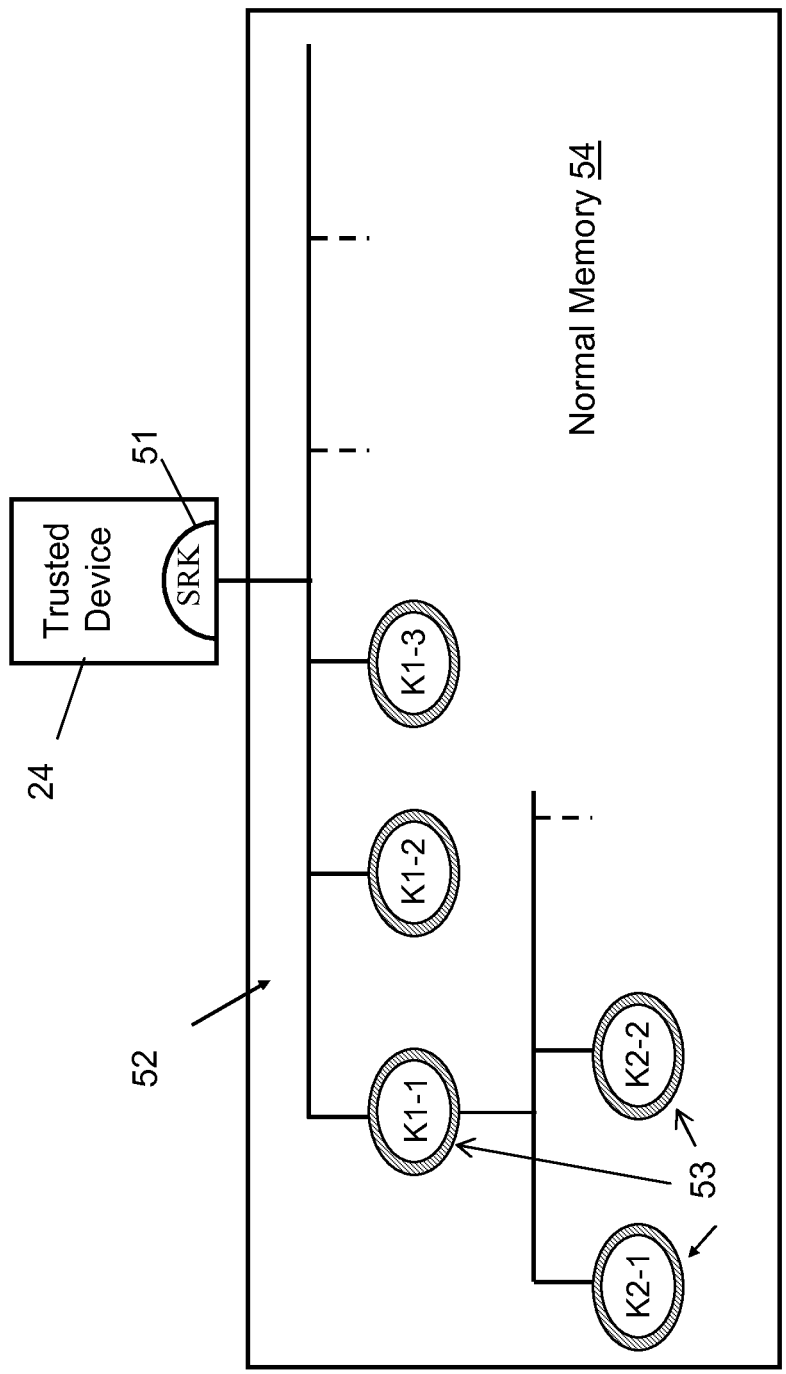
FIG. 5 is a diagram of a key hierarchy associated with a trusted entity.

One approach to implementing protected storage in the trusted device 24 will now be described with reference to FIG. 5, this approach being that defined for use in TPMs. As illustrated in FIG. 5, in this approach, protected storage is implemented as a hierarchy (tree) 52 of data items the root of which is a Storage Root Key (SRK) 51 that is permanently stored in the trusted device 24 (and not released from it). Apart from the SRK, the tree 52 can be stored outside of the trusted device in normal memory 54. When information in a node of the tree is used or revealed, the node is manipulated by the trusted device. Each intermediate node object in the tree is encrypted by a key in the node object above it in the tree (the parent node), all the way back to the SRK root node; in FIG. 5 only two levels are shown below the SRK, namely a first level storing keys K1-1 to K1-3 and a second level storing keys K2-1 and K2-2 (the encrypted nature of each key being indicated by the surrounding hatched annulus). In this particular example, keys K2-1 and K2-2 would have been encrypted using key K1-1, and key K1-1 would have been encrypted using the SRK. Each key has an associated authorisation value that an entity wishing to make use of the key must present to the trusted device 24 (or, more accurately, used in a protocol that proves knowledge of the value without revealing the value) before the trusted device permits the key to be used. Intermediate nodes in the tree will always be keys but leaf nodes can be arbitrary data (though frequently they will also be keys, such as symmetric keys for use by application processes in protecting bulk data). Keys in the tree can either be "non-migratable" meaning that the private key is only known to the trusted device, or "migratable" meaning that there is no guarantee about the origin and use of the private key, which can be used by other TPMs and trusted entities or, indeed, by any other device or process.

As has already been described in relation to the prior art, provision is made by a known TPM to prevent data in an opaque blob from being released if a configuration (and respective integrity metric) of a computing platform, which is protected by the TPM, has changed since the data was sealed in the opaque blob. This procedure adds a significant degree of trust to operations of a computing platform. Aspects and embodiments of the present invention provide additional or alternative trust mechanisms to operations, particularly in cases where a configuration of a trusted platform has not changed. More particularly, provision is made for a data owner to specify TPM environments that are trusted (that is, are acceptable), and/or not trusted (that is, are not acceptable), for carrying out operations on the data, and a TPM (or the like) is adapted to establish if its operating environment is compatible with the specified environments before operating on (or not operating on) the data. Compatibility may be defined in terms of whether characteristics of a TPM environment are in accord with characteristics or criteria specified by the data owner. According to various embodiments of the invention, such characteristics or criteria may be specified by data owners in different ways. In certain embodiments, TPM environments may be specified in terms of security algorithms that may be used, may not be used and/or have been used, as will be described in more detail below.

Figure 6:
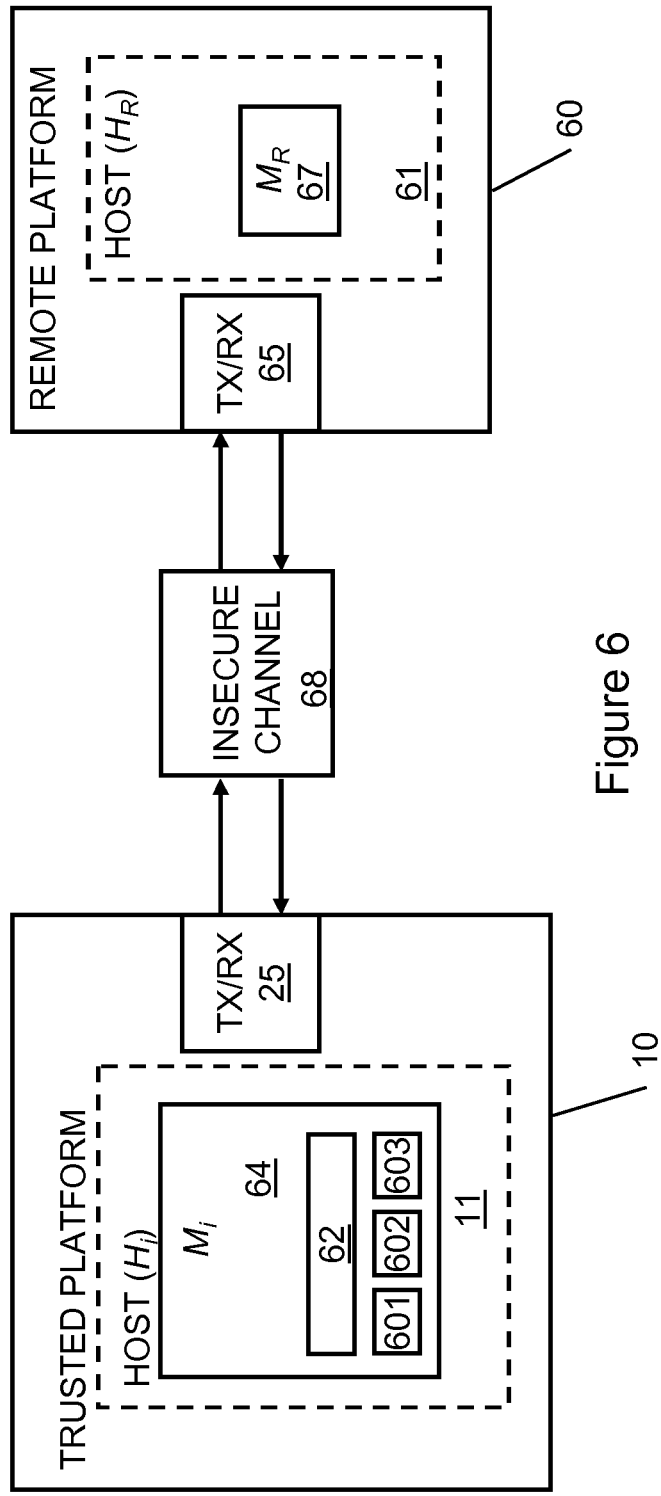
FIG. 6 is a schematic diagram of a system including a trusted computing platform and a remote computing entity according to embodiments of the present invention.

Aspects of the present invention will now be described with reference to embodiments employing—in some cases modifying—the trusted computing platform structure indicated above, which incorporates a hardware TPM, in the context of a system as shown in FIG. 6. Where particular modifications to the hardware TPM are described, it is to be understood that equivalent modifications could be made to other kinds of hardware trusted device and to software, or virtual, trusted entities.

The system in FIG. 6 comprises a trusted platform 10 as described herein, which communicates with a remote computing entity 60 via an insecure communications channel 68, for example the Internet. Other communications channels could be intranets, virtual private networks or point to point connections, to name only a few. The computing entity 60 may also be a trusted computing platform as described herein. The trusted platform 10 has executing on it a host process $H_i$ 11, which is adapted to interact with the trusted device $M_i$ 64 via a process, such as the TPM software stack (TSS) or the like. The TSS provides a standard API for accessing the functions of a TPM. Of course, alternatives to the TSS may be provided depending on the particular nature of the trusted device.

According to the present embodiment, the trusted device 64 is similar in most respects to the one 24 described above, but supports a plurality of cryptographic algorithms 62 (e.g. one or more sets of cryptographic algorithms), providing alternative algorithms for hashing, signing, encrypting or decrypting specified data. Thus, a data owner can select which algorithms or sets of algorithms should be used for operating on his data. Finally, according to the present embodiment, the memory contains a record or records including lists 601-603 of indicators of hashing and/or other kinds of security algorithms, the particular purpose of which will be described below.

The remote computing entity 60 also has a trusted host process $H_R$ executing on it and a trusted device $M_R$ 67. The first and second trusted platforms communicate with each other via respective I/O interfaces 25 and 65. In principle, the remote computing entity does not need to be a trusted platform as such but it does require the capability to generate and verify digital signatures provided by the trusted computing platform 10. However, in practice, and in all likelihood, the remote computing entity will also be a trusted platform, insofar as the host $H_i$ may not be willing to interact with a platform that offers less security.

As indicated previously, it is desirable not to be locked into use of any one kind of security algorithm—whether a hashing algorithm (or any other kind of cryptographic algorithm)—because vulnerabilities in security algorithms appear over time. Considering hashing by way of example, the ability to use more than one hashing algorithm (and, preferably, to enable protection of data to migrate from one hash algorithm to another) can be termed "hash agility". It is thus strongly desirable for trusted entities in general to support hash agility. This is now of real importance, because a weakness has been discovered in the currently used hashing algorithm, SHA-1. This affects the fundamentals of TPM data architecture because digests should be labelled with the type of the algorithm that created them, and because some current data structures cannot accommodate larger sized digests.

Next generation TPMs should also be compatible with current generations of TPMs, to allow compatible operation between generations. Preferably, a next generation TPM should be a simple superset of a current TPM specification, so future TPMs could automatically provide current functionality and TPM interfaces would need minimal alteration.

An approach to achieve this will now be described. According to this approach, a TPM can use a security algorithm and can partition data according to a set of algorithms that are permitted to be used while protecting it. This approach can maintain confidence between interacting parties while also, as is described below, provide the possibility of mechanisms for migrating data from protection under a compromised algorithm to protection under an acceptable algorithm.

The principles indicated below can be applied readily to all forms of security algorithm (for example, encryption, decryption, hashing, signature and verification), as the person skilled in the art will appreciate.

When we consider using or denying the use of certain algorithms hereafter, it is to be understood that algorithms are often applied in sets, or tuples. When considering a TPM, for example, a set may comprise four algorithms:—for example algorithms for signing, encryption, HMAC and for generating digests. More generally, an asymmetric encryption scheme may be represented by the tuple (GenKey( ) Enc( ) Dec( )), respectively representing key generation, encryption and decryption algorithms, and be associated with public and private keys ($pk_X$ and $sk_X$). Another example of a set is a digital signature scheme, which may be presented as (GenKey( ) Sign( ), Verify( )), respectively representing a key generation algorithm, a signing algorithm and a verifying algorithm. Accordingly, references to the use of certain algorithms herein (as the context dictates) may apply to a single algorithm or to a set of algorithms.

According to certain embodiments of the present invention, when a data owner requires a TPM to operate on his data, the data owner specifies an "environment list" indicating algorithms that are permitted to be used by a TPM in a current boot cycle; that is, since the platform was last booted. The environment list specifies a permissible TPM environment (or environments) within which the data owner is happy for the data to be operated on. In principle, the environment list may specify generally which security algorithms can be used by the TPM for any required operation. In embodiments to be described, the data owner also specifies a "use list" of security algorithms (or sets of algorithms) that are to be used by the TPM to operate on (e.g. encrypt, decrypt and hash etc.) the respective data. The use list may include just one algorithm for each purpose or plural algorithms, in which case the TPM may be adapted to choose (for example, on the basis of availability) which algorithm to use. In other words, the environment list specifies which algorithms can be used in general by the TPM whereas the use list specifies which algorithms in particular are to be used by the TPM to operate on the associated data.

One straightforward use of the environment list is to prevent the TPM from operating on associated data if the TPM has already used a security algorithm that is not included in the environment list. Additionally, after data has been operated on, for example to seal the data in an opaque blob, the associated environment list enables the TPM to determine whether it is appropriate to unseal the data having regard to what algorithms have already been used. In principle, in some embodiments, the environment list could be used to prevent a TPM from operating on the respective data if the TPM supports a security algorithm that is not included in the environment list, irrespective of whether or not the TPM has used that algorithm, for example, in a current boot cycle. However, in most practical embodiments, decisions are expected to be based on whether an un-trusted algorithm has been used rather than whether it is available.

Additionally, when the TPM has operated on the data, for example to produce a digest, it is adapted to associate the resulting data with the environment list and the use list, for reasons which are described below.

It will be appreciated that, while an environment list can be specified in terms of security algorithms that can be used by the TPM (that is, an "explicit" list), there are other ways of specifying an environment. For example, instead of indicating which algorithms can be used, an environment list may state which algorithms cannot be used: then, for example, unlisted algorithms (that is, an "implicit" list), by implication, could be used. In other words, in this case, the environment list may act as a forbidden list. Of course, an environment list may include both approved and forbidden lists in some cases. Further, in principle, the criteria may provide more granular restrictions, for example indicating circumstances under which algorithms can be used and for which particular purposes. Other criteria, including any combination of the criteria indicated above, may be applied.

Referring again to FIG. 6, in order to apply the principle of the environment list efficiently according to certain embodiments of the present invention, a TPM 64 is adapted to keep in a "history list" 601 a record indicating all security algorithms used by the TPM since it last booted. Additionally, the TPM 64 is adapted to keep in an "item list log" 602 a record of each item of data that has been operated on and the environment and use lists that are associated with each item of data; the data item is in effect 'tagged' with its respective environment and use lists Furthermore, according to certain embodiments of the present invention, the owner of a trusted platform diligently maintains a "forbidden list" 603 of security algorithms that the TPM must not use; inside his TPM or outside of the TPM given appropriate protection, for example encryption by the TPM. In this example, the forbidden list 603 is stored on the TPM. If a forbidden list in some form is not maintained, data (especially keys) apparently protected by a TPM may in fact be vulnerable. Accordingly, before the TPM uses an algorithm, it verifies by reference to the forbidden list 603 that it is not a forbidden algorithm. Thus, according to some embodiments following this approach, a TPM is adapted to support (and can apply) a certain number of algorithms, but is prevented (by a self-imposed restriction) from using algorithms present in the forbidden list 603 (containing zero or more algorithms that must not be used, for example because they have become discredited). The host and TPM are adapted to manage (that is, update the list by the addition of further discredited algorithms) the list, for example, by (trustworthy) requests from the host 11 to the TPM 64.

Figure 7:
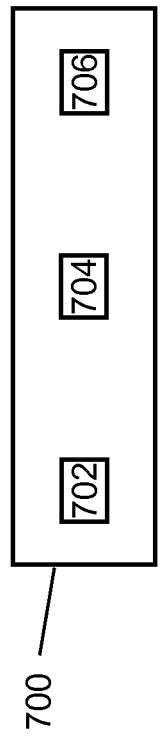
FIG. 7 is a diagram illustrating a request to generate a digest on a message.

Application of the above to the use of hashing algorithms to create a digest is as follows. With reference to FIGS. 6 and 7, when a TPM 64 is requested to create a digest, a request 700 is submitted by the host Mi with a reference to message 702 on which the digest is to be created, an indication contained in a use list 704 of the type of algorithm to create the digest and an environment list 706 as indicated above. The TPM is adapted to tag (or otherwise associate) the resulting digest with both the use list 704 and the environment list 706. These associations are stored on board the TPM 64 (or outside of the TPM given appropriate protection), in the item list log 602. Thereafter, if the TPM 64 wishes to use the digest, it verifies that the TPM's history list 601 is the same as (or a subset of) the digest's environment list 706. This enables a TPM to use multiple algorithms in the same boot cycle and also, as will be indicated below, enables a graceful retreat from a discredited algorithm.

FIGS. 8 to 11 are Venn diagrams illustrating different scenarios relating to security algorithm use and availability in a TPM environment. Specifically, the diagrams represent different scenarios in which a request is made by a data owner to the TPM to generate a digest, wherein the message to be hashed is accompanied by a use list 704 and an environment list 706 of permitted algorithms. In other words, the Venn diagrams in FIGS. 8 to 11 exemplify scenarios before a TPM operates on (or refuses to operate on) data provided by a data owner.

Figure 8:
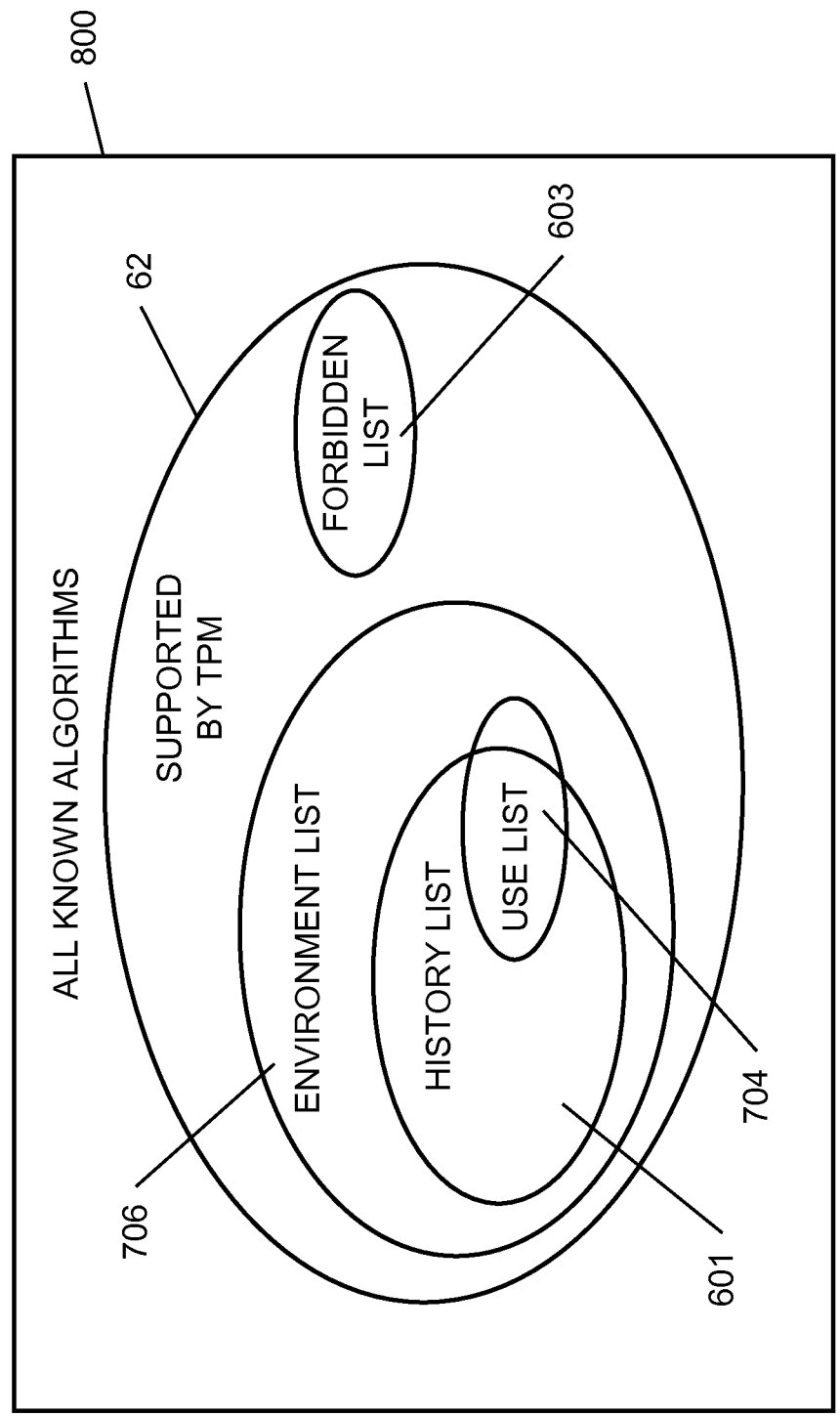
FIGS. 8 to 11 are Venn diagrams illustrating different scenarios relating to security algorithm use and availability in a TPM environment before data is operated on, according to embodiments of the present invention.

The diagram in FIG. 8 illustrates a universal set 800 of all known security algorithms and the sets 62 of all security algorithms supported by a TPM 64. The diagram also shows the forbidden list 603 of the TPM, which, in this example, is a subset of the algorithms supported by the TPM. Further, the diagram shows the environment list 706 provided by a data owner and a history list 601 of the TPM. More particularly, the environment list 706 includes only entries for algorithms that are supported by the TPM, and the history list 601 is a subset of the environment list; that is, the environment list also includes algorithms that have not (yet) been used (i.e. they are not in the history list). Further, the diagram shows the use list 704 as a subset of the environment list 706 and (in this example) intersecting with the history list 601.

According to the scenario represented in FIG. 8, the TPM would proceed to operate on the data provided by the data owner. This is because, the history list 601 contains only algorithms that are in the environment list 706 specified by the data owner. In other words, the TPM has not used algorithms that the data owner may believe are less trustworthy or, indeed, are discredited. In other words, clearly, the environment specified by the data owner (in terms of the environment list 706 and the use list 704) is compatible with the operating environment of the TPM (specified in terms of the history list 601) and the requested operation can take place.

Figure 9:
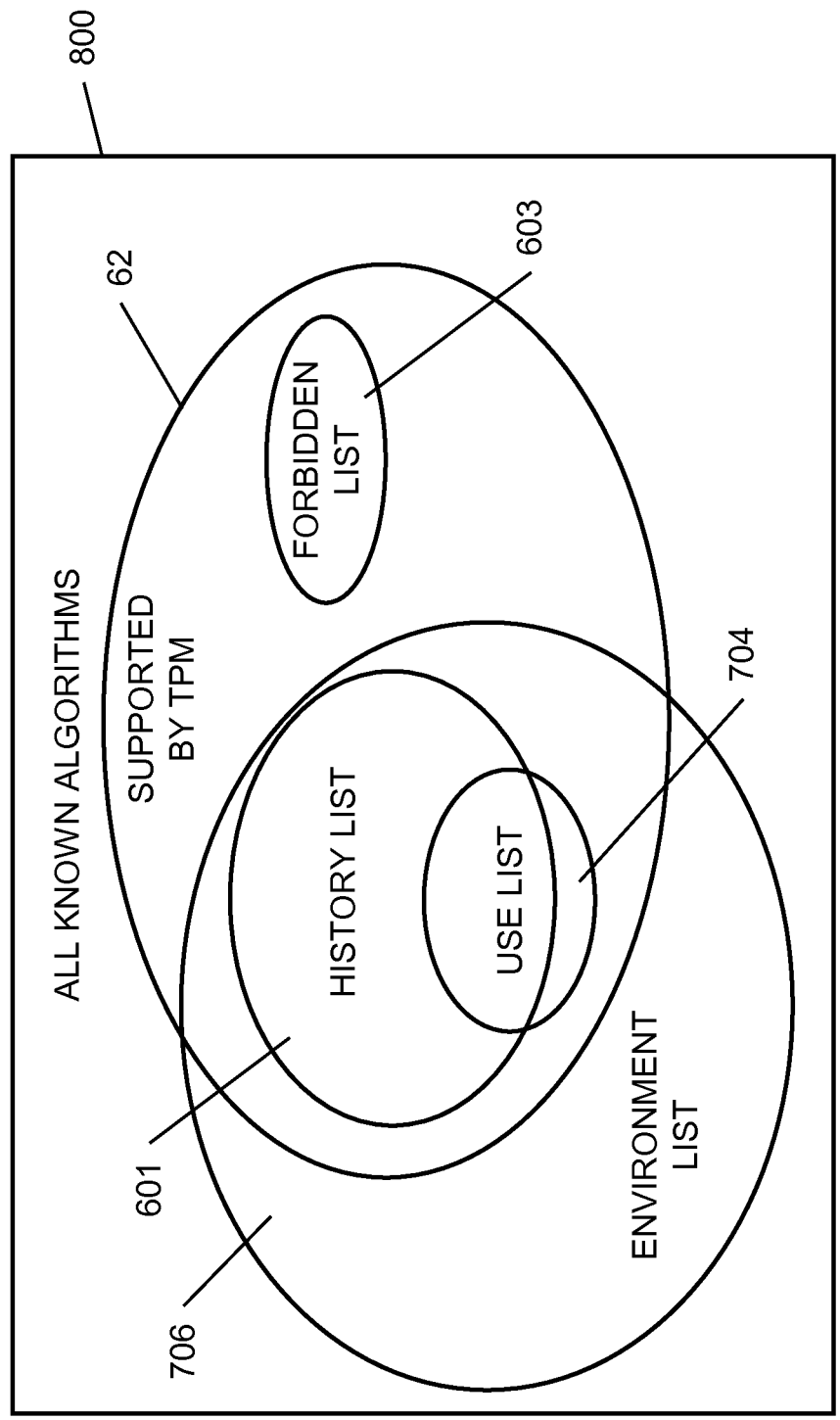

The Venn diagram in FIG. 9 is similar to the one in FIG. 8, except that the environment list 706 also contains entries that are not supported by the TPM. Under these circumstances, as the history list 601 is still a subset of the environment list 706, the TPM would again be adapted to permit generation of the digest. Again, clearly, the environment specified by the data owner (in terms of the environment list 706 and the use list 704) is compatible with the operating environment of the TPM (specified in terms of the history list 601) and the requested operation can take place.

Figure 10:
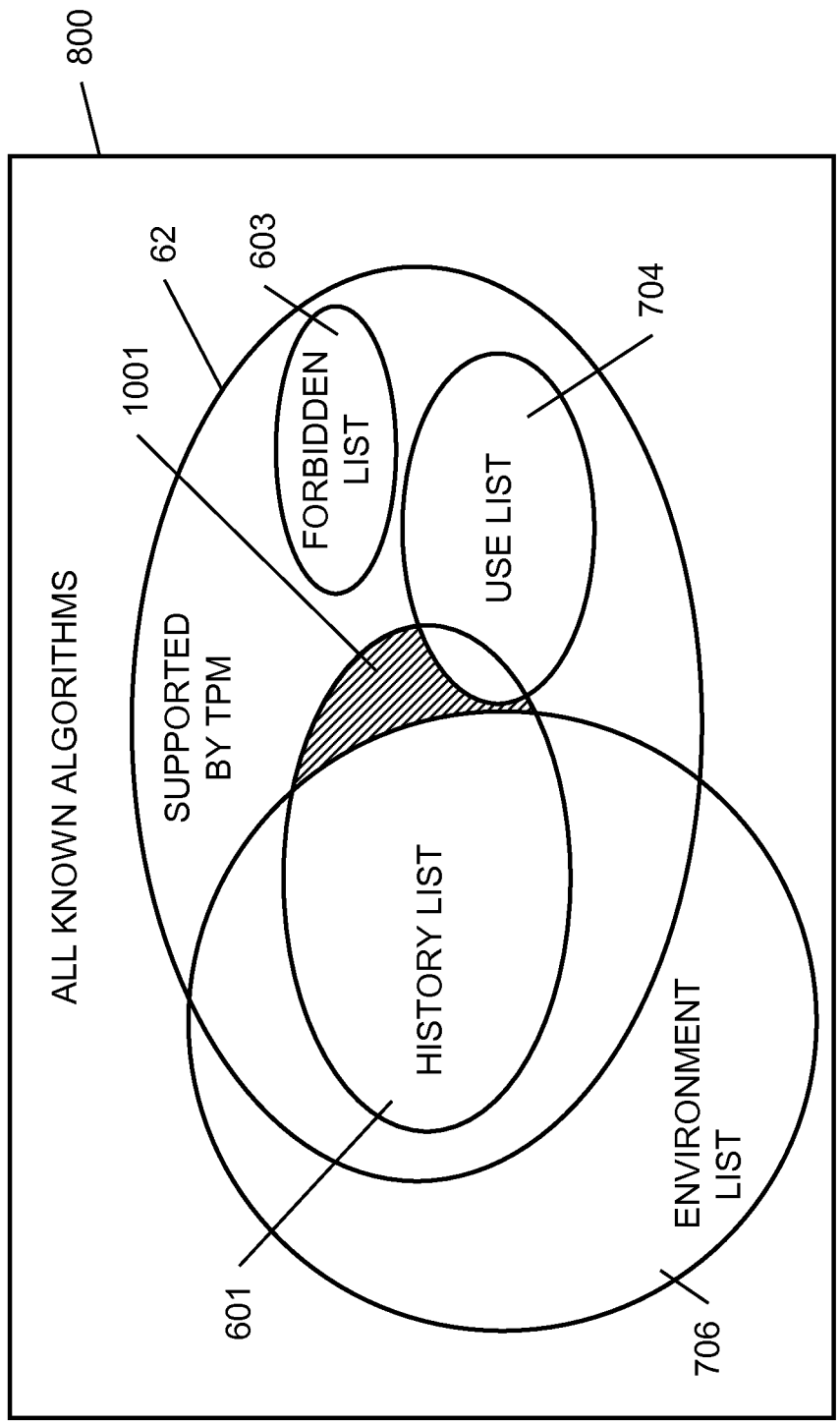

In the Venn diagram in FIG. 10, the use list 704 and the environment list 706 are represented as non-overlapping sets; that is, the two sets are disjoint. In other words, the data owner specifies independently which algorithms are to be used on the data and which (different) algorithms can be used more generally by the TPM. According to embodiments of the present invention, environment and use lists can be defined either as being disjoint in this way or with the use list being a subset of the environment list; and the TPM could be adapted to process either or both. In this case, the TPM is adapted to compare the history list 601 with both the use list 704 and the environment list 706 to determine whether the TPM's environment is acceptable to the data owner. However, as shown, the history list 601 contains entries 1001 that are neither in the environment list 706 nor the use list 704. Thus, since the TPM has used algorithms that are not approved by the data owner, the TPM would prevent generation of the digest, and the data owner (or requesting process) would be informed. In other words, due to the fact that the TPM has used security algorithms 1001 that are not included in the environment list 706 (that is, they are not approved by the data owner), the TPM environment is deemed incompatible with the environment specified by the data owner and the requested operation cannot take place.

Figure 11:
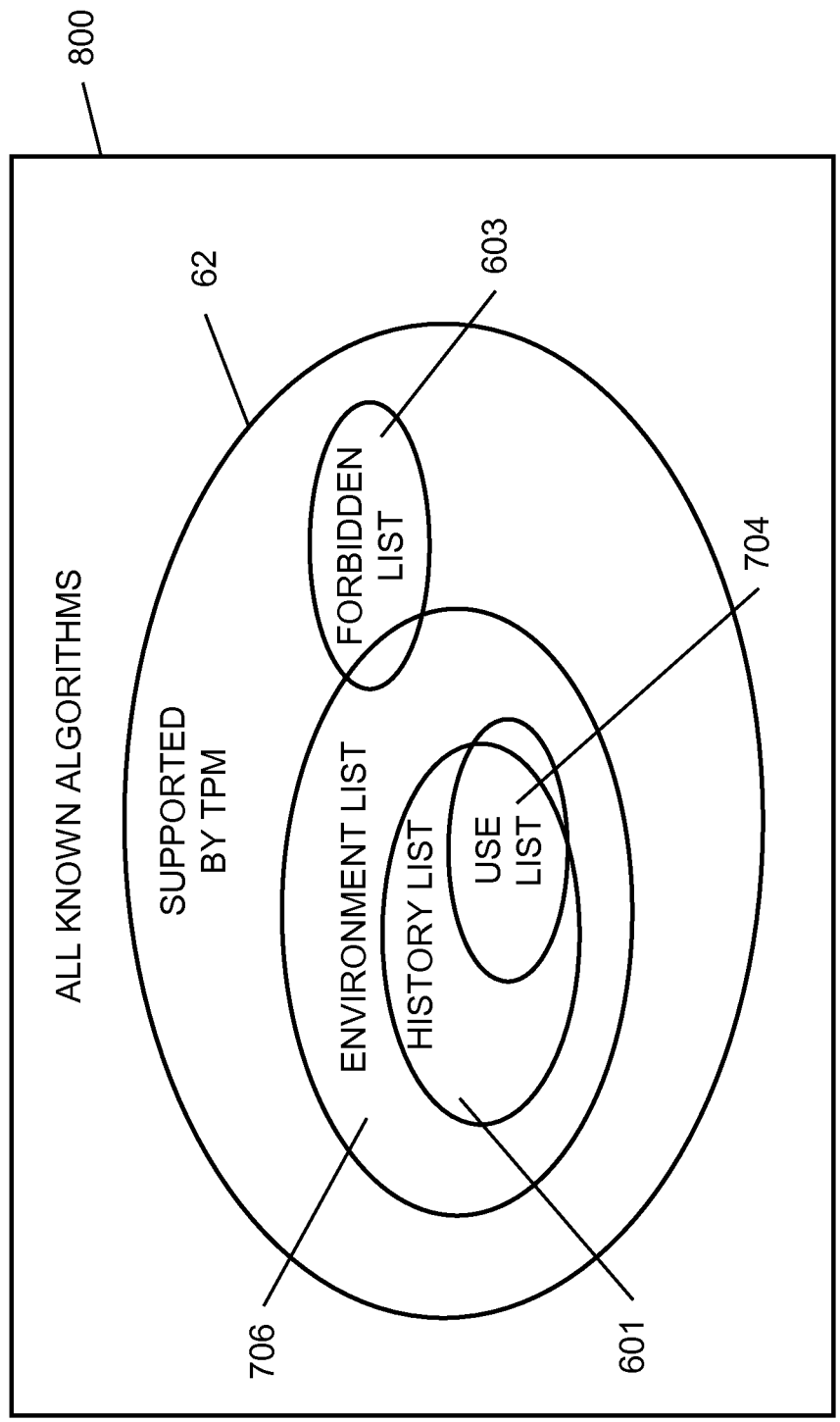

In the diagram in FIG. 11, which is similar to FIG. 8, the forbidden list 603 overlaps with the environment list 706. In this case, the TPM would be adapted to permit generation of the digest, since, although there is an overlap between the forbidden list 603 and the environment list 706, clearly, no algorithm from the forbidden list has been used, and so there is no possibility, in the current boot cycle, that the TPM or its data have been subverted by the use of discredited algorithms. Again, in other words, the environment specified by the data owner (in terms of the environment list 706 and the use list 704) is compatible with the operating environment of the TPM (specified in terms of the history list 601) and the requested operation can take place.

Figure 12:
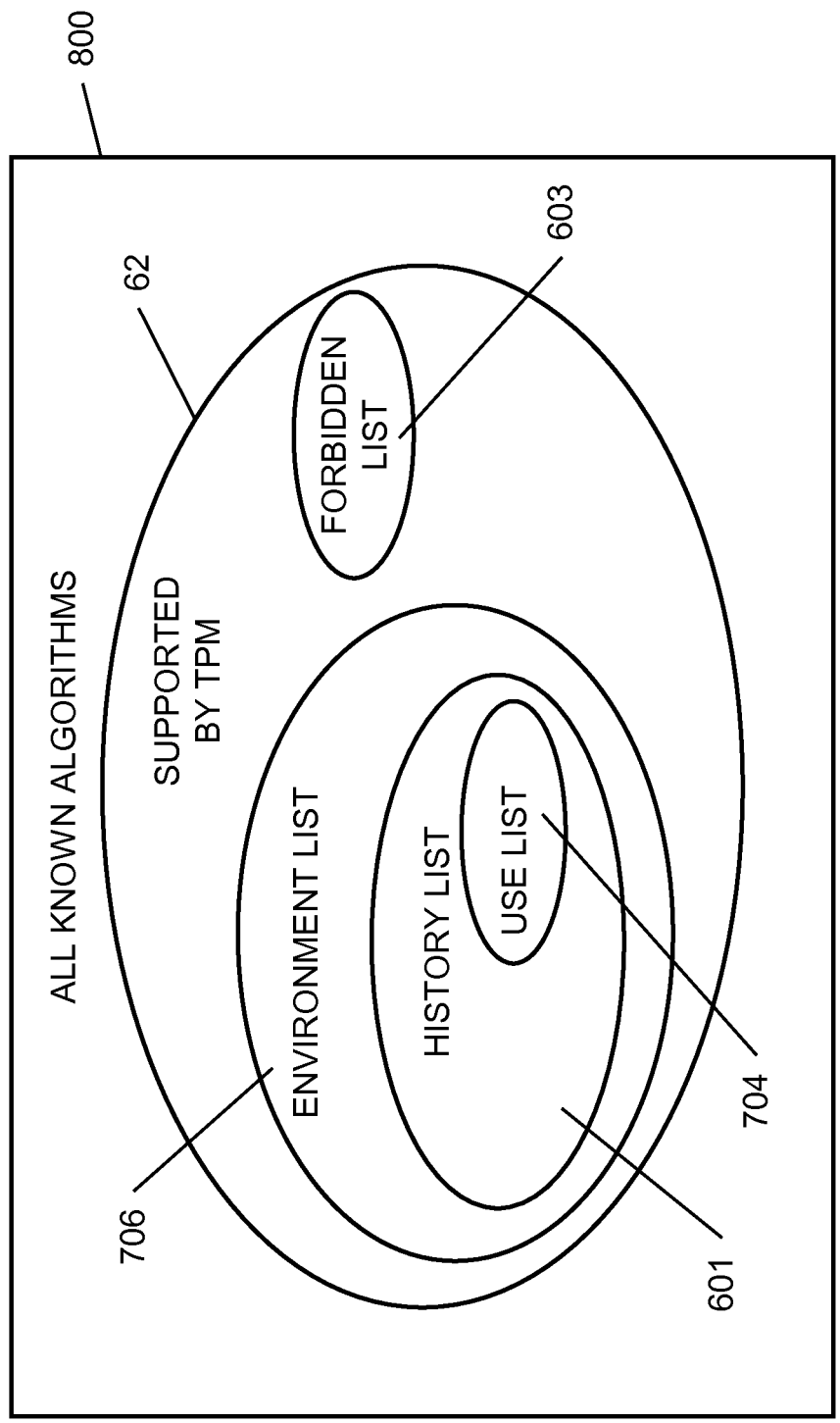
FIGS. 12 and 13 are Venn diagrams illustrating different scenarios relating to security algorithm use and availability in a TPM environment after data had been operated on, according to embodiments of the present invention.

The Venn diagram in FIG. 12 is based on the example in FIG. 8 but represents an exemplary situation some time after the TPM has operated on the user data to produce a digest and seal it as an opaque blob. Assuming that the platform configuration and respective integrity metrics have not changed, the only difference in this example is that the use list 704 has become a subset of the history list 601; as the hash algorithm specified by the use list would have been used by the TPM to generate the digest. If the TPM is instructed to use the digest, it is adapted to first determine from the item list log 602 of the TPM that the history list 601 is still a subset of the environment list 706. Accordingly, the TPM is able to reveal and use the digest. In other words, in this example, the environment that was originally specified by the data owner (in terms of the environment list 706 and the use list 704) remains compatible with the operating environment of the TPM (specified in terms of the up-to-date history list 601 of the present boot cycle) and the requested operation can take place. Of course, the use list 704 typically specifies a number of algorithms, only a subset of which may have been used (for example just the hashing or encryption algorithm), in which case, strictly-speaking, the use list may not be a complete subset of the history list. However, for simplicity of description only, the use list is shown as a subset of the history list.

Figure 13:
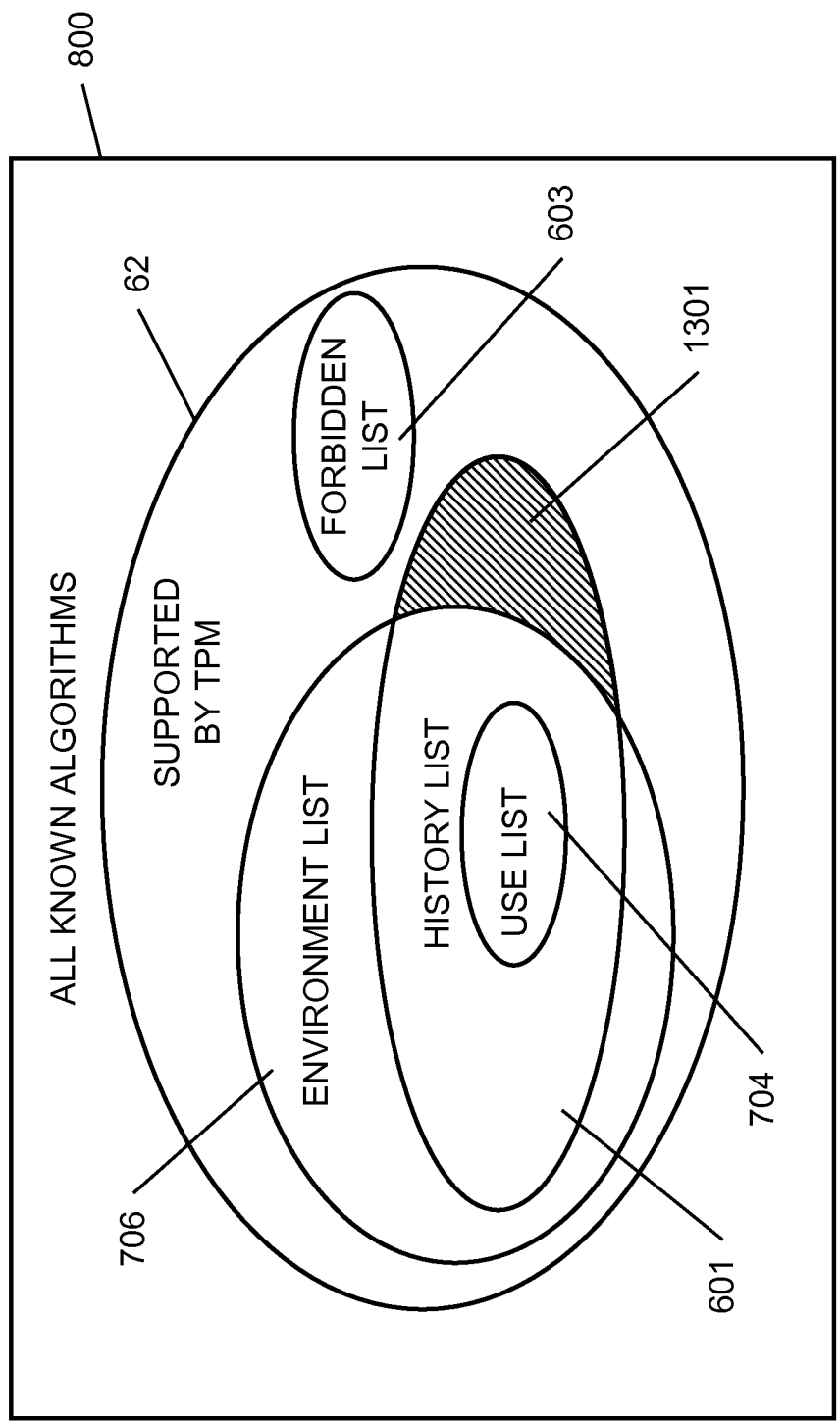

In contrast, the Venn diagram in FIG. 13, which is also based on the example in FIG. 8, illustrates the case where, after producing and sealing the digest, the TPM has used algorithms 1301 that were not included in the respective environment list 706 provided by the data owner. In this case, if the TPM is instructed to use the digest, it determines from the item list log 602 of the TPM that the history list 601 is no longer a subset of the environment list 706. The default assumption is that the data owner would not wish the digest to be revealed in an environment in which un-approved algorithms had been used and, therefore, the TPM refuses to reveal and use the data digest. In other words, due to the fact that the TPM has used security algorithms 1301 that are not included in the environment list 706 (that is, they were not approved by the data owner), the TPM environment is deemed incompatible with the environment originally specified by the data owner and the requested operation cannot take place.

A significant benefit of embodiments of the present invention is that, since different algorithms are supported and can be used, typically only a subset of TPM data (especially "key blobs", being "sealed blobs" as described earlier in this specification, which protect cryptographic keys) is tainted if a particular algorithm or algorithm set is discredited; either directly (because it uses that algorithm) or indirectly (because that algorithm is in the data's "environment list").

Figure 14:
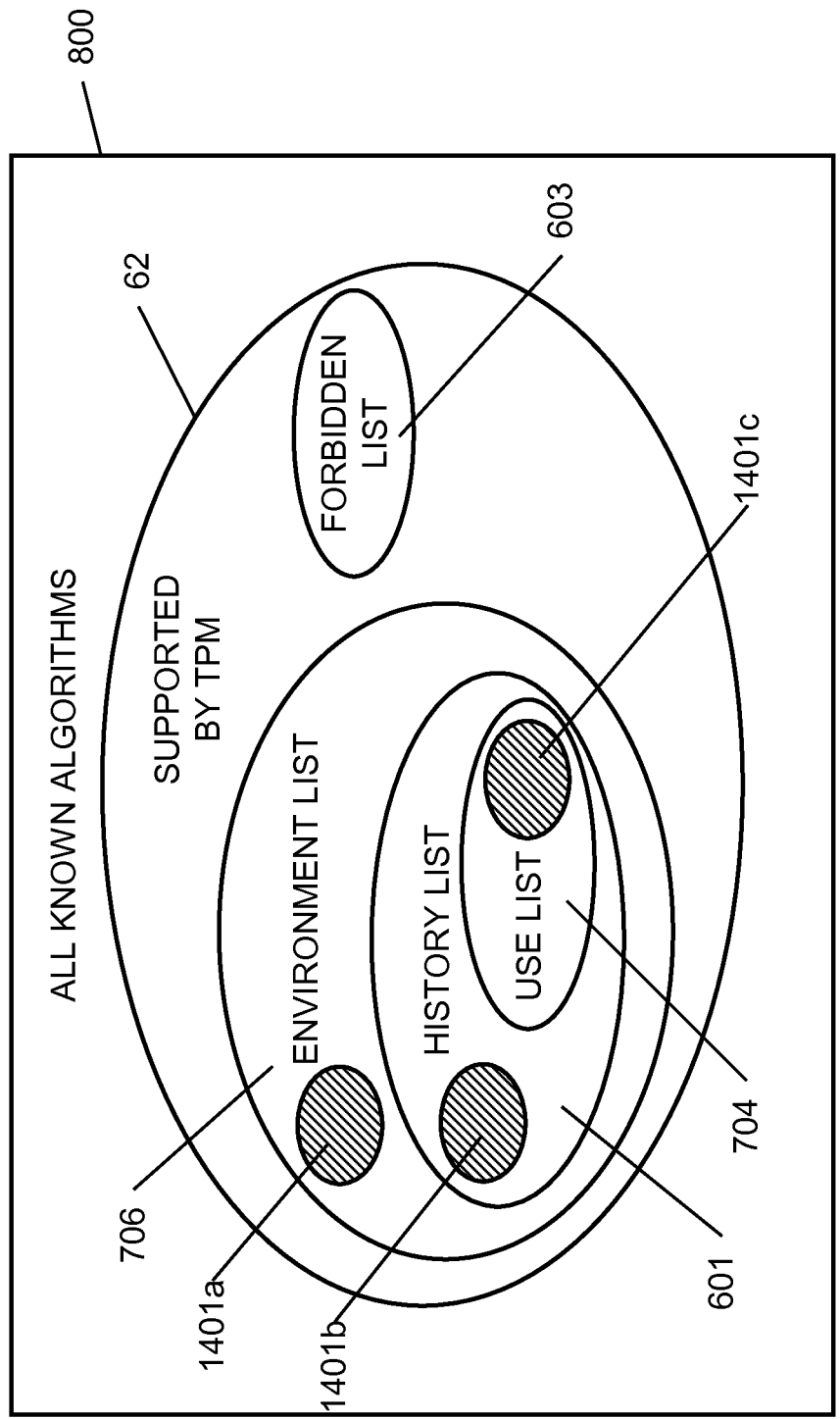
FIG. 14 is a Venn diagram illustrating security algorithm use and availability in a TPM environment after data has been operated on, when one or more security algorithms have been discredited.

The Venn diagram in FIG. 14, which is similar to the diagram in FIG. 12, illustrates three possible discredited algorithms or algorithm sets 1401a-1401c. If a first discredited algorithm 1401a falls within the environment list 706, which is associated with some TPM data, that TPM data is indirectly tainted but not directly tainted. An operation to re-establish confidence in indirectly tainted data will be described below. If the discredited algorithm 1401a is added to the forbidden list 603, this creates an intersection between the environment list 706 and the forbidden list 603, similar to the scenario illustrated in FIG. 11 and thereafter the TPM would not be able to use the discredited algorithm due to its presence in the forbidden list 603.

If a discredited algorithm 1401b falls within the environment list 706 and the history list 601, then the TPM data associated with the environment list would again be indirectly tainted. Indeed, all TPM data having an associated environment list into which the discredited algorithm 1401b fell would be indirectly tainted. Again, the discredited algorithm 1401b would be added to the forbidden list 603.

If a discredited algorithm 1401c falls within (or in any way overlaps with) the use list 704 associated with the TPM data, then that data is directly tainted because it resulted from an operation on information using the discredited algorithm or algorithm set, and because future operations on the data will require use of the discredited algorithm or algorithm set. An operation to re-establish confidence in directly tainted data will be described below. If the discredited algorithm 1401c is added to the forbidden list 603, this creates an intersection between the environment list 706 and the forbidden list 603, similar to the scenario illustrated in FIG. 11 and thereafter the TPM would not be able to use the discredited algorithm due to its presence in the forbidden list 603. Directly tainted data can no longer be trusted and should be placed beyond use by the TPM, for example by deletion. In practice, the directly tainted data could be stored in the TPM, in main memory of the trusted platform or in external storage such as a hard disk, and the TPM would be adapted to delete the data irrespective of where it is stored.

Figure 15:
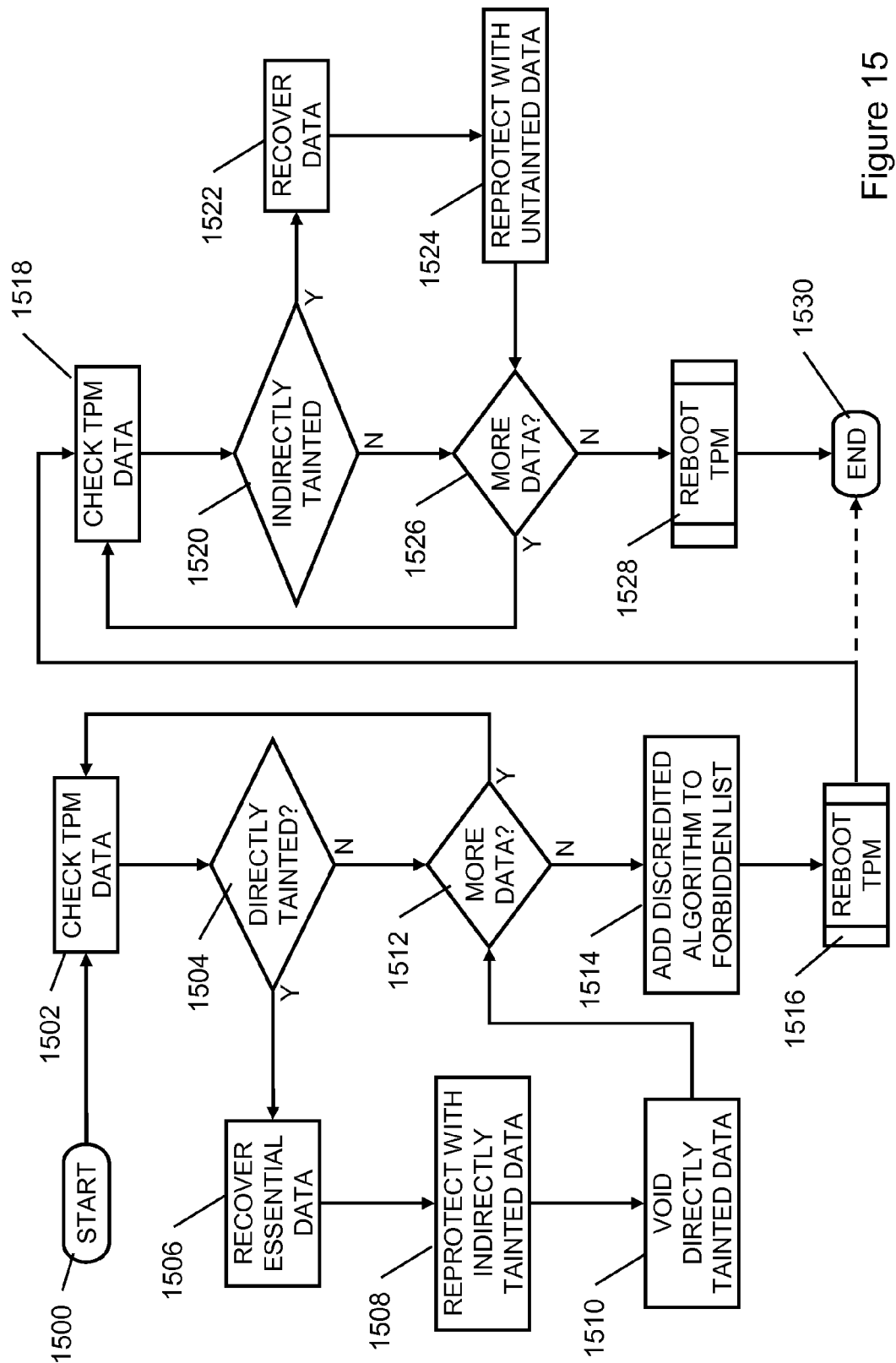
FIG. 15 is a flow diagram illustrating steps involved in recovering from one of the security algorithms having been used and subsequently discredited.

The flow diagram in FIG. 15 illustrates an exemplary process that may be applied when an algorithm is identified as being discredited. It will be appreciated that the steps in the flow diagram may be applied in different orders depending on the particular implementation of the TPM and that other, alternative, processes could be used.

The process starts in a first step 1500 after a discredited algorithm has been identified. The TPM evaluates each entry in its item list log 602 in turn in step 1502. In step 1504, each entry in turn is evaluated and if an entry indicates that associated data (e.g. an opaque key blob) has been directly tainted (due to its production using the discredited algorithm), in step 1506, the respective tainted information (e.g. the key from the opaque key blob) is recovered and used once to recover other data that had been protected using it. Each item of recovered data is re-protected using indirectly tainted data in step 1508 (that is, data that uses an algorithm that is not itself compromised, but is associated with a compromised algorithm by appearing in a common environment list). Then, in step 1510, the directly tainted data is deleted to prevent it from being used again, and the respective entry is removed from the item list log 602. If, in step 1512 it is established that there are more entries in the item list log 602 to evaluate, the process returns to step 1502 to check the next entry. If all entries have been evaluated, then the discredited algorithm is added to the forbidden list 603 in step 1514 and the TPM reboots in step 1516 using just indirectly tainted data and untainted data (that is, where the environment list 706 and use list 704 are disjoint to those involving the discredited algorithm).

The process could, in principle, end at this point, (as indicated by the dotted line arrow between steps 1516 and 1530), if it is deemed that the risk posed by maintaining indirectly tainted data is insufficient to warrant additional steps. However, if it is desired to further reduce risk posed by even indirectly tainted data (for example, because there is an increased risk that the data may be used with directly tainted data in another environment), the process continues with step 1518, in which the TPM re-evaluates each entry in its item list log 602. If, in step 1520, an entry indicates that data is indirectly tainted, the respective data is recovered in step 1522 and re-protected in step 1524 using untainted data; in other words, the protection could be applied to the information again with an environment list that contains only untainted algorithms (to the extent such algorithms are available). The environment list may be a new list entirely or one based on the original but having had the discredited algorithm(s) removed. If, in step 1526 it is established that there are more entries in the item list log 602 to evaluate, the process returns to step 1518 to check the next entry. If all entries have been evaluated, then the TPM reboots again in step 1528 using just untainted data, thus re-establishing full confidence in the TPM's protection because none of the TPM data have been dependant upon the discredited algorithm, and the process ends in step 1530.

This two-step process migrates both the TPM and its data away from a discredited algorithm completely—as already indicated, the need for the second step (from step 1518— migration from indirectly tainted data) is dependent on the degree of security deemed to be necessary. Of course, the process illustrated in FIG. 15 could transition directly from the start 1500 to test 1518 for indirectly tainted data if there is no tainted data.

The migration process could be built into the TPM 64, whereby the TPM could migrate tainted information in response to it becoming apparent that one of the available security algorithms has been discredited. Alternatively, the migration process could be controlled by a combination of the host 11 and the TPM 64. For example, the TPM would be able to compare its forbidden list 603 with environment lists that are associated with certain information and identify when a conflict occurs. In response, the TPM 64 could send a message to the host 11, indicating that the information is potentially compromised, refusing to use the information and requesting the host to provide instructions to migrate the information.

According to the present embodiments, for full protection, stored data protected using forbidden algorithms must be voided (such that it can never be used in future), but this could create significant practical difficulties for users. Again, it is expected that the host 11 and TPM 64 could be arranged to interact to manage the conflict. For example, to mitigate the difficulties, the owners of the stored data could be informed of the problem and the compromised data could be identified, so that the owner could take steps to replace the data (if necessary) with fresh data protected by new hashing algorithms.

Particularly significant among data to be protected in this way are keys. A key can be tainted by hashing algorithms other than the one it actually uses, because keys can be protected by other keys (for example, in the Protected Storage hierarchy in accordance with TCG specifications), and those other keys might use different hash algorithms.

Implementations of specific features discussed or implied above in accordance with existing TCG specifications and approaches will now be discussed.

Telling a TPM the Hash Algorithms to Associate with New Digests that Will be Created During the Next TPM Command.

According to some embodiments, this may be done by a new authorisation data packet, sent immediately before passing a currently specified TPM's authorisation packet to the TPM. The new packet would use the same nonces as used by the following current specification authorisation packet, and use an HMAC (keyed-hash message authentication code), to sign a digest of the following command plus the hash algorithm to be used by the new digests and their environment list.

Tagging (by the TPM) of Blobs that Will Be Reloaded Back into the TPM.

According to some embodiments, blobs are tagged via a new ticket signed by an HMAC, containing the algorithm used, the environment list and the parent list, and a digest of a current specification TPM blob. This new ticket would be passed immediately before an existing specification TPM blob. The HMAC is signed by a secret known only to that TPM, such as the existing TCG data structure called tpm-Proof.

Tagging (by the TPM) of Blobs that Won't be Reloaded Back into the TPM.

Migration (key) structures are tagged via a new ticket, encrypted or signed by the migrated privKey (depending on whether it is a storage key or signing key), containing a digest of the migratory data digest, the environment list and the parent list. The new ticket would be passed immediately before existing TPM specification migration data. (Obviously, if the size of a digest is too large to fit into an existing TPM specification data structure, the architecture of the migration data blob must be changed, and use symmetric encryption.)

The TPM Reports the Hash Algorithms Associated with Keys.

TPM_CERTIFY_INFO structures are modified to include the key's algorithm and environment list.

A TPM Keeps Two Lists of Hash Algorithms

According to some embodiments, the two lists are:
(a) A history list records all the hash algorithms used by the TPM since boot. The list is preferably automatically populated by a TPM.
(b) A forbidden list is a list of all the hash algorithms that are not trusted by the owner of the trusted platform containing the TPM. In an unowned TPM, the TPM's list of forbidden algorithms is empty. The list can be changed at any time using an owner authorised command. If the forbidden list and the history list overlap, the TPM must cease operation until it is rebooted.

The TPM Reports the State of the Hash Algorithms in the TPM.

A new TPM_GetCapability returns the TPM's current history list and forbidden list.

A Privacy-CA Indicates the Hash Algorithm that it Requires the TPM to Use to Decrypt Data During ActivateIdentity.

A Privacy-CA is a certifying authority—typically chosen by the trusted platform owner—to issue an identity or identities to a subsystem (TPM in an appropriate computational environment). This indication can be by a new data field inside TPM_ASYM_CA_CONTENTS.

Indicating the Environment List Associated with a Key

This can be done by augmenting the description (TPM_KEY, for example) of a key to include fields that indicate the environment list associated with the key. This may require further additional fields in the key's description to indicate a specific Protected Storage hierarchy (via tpmProof and/or information indicating a particular SRK or associated with a particular SRK, for example), especially if the environment list is indicated via a reference.

Aspects and embodiments of the present invention provide a new TPM having a design that permits the TPM to concurrently use different hash algorithms and be backwards compatible with existing TPM specifications. More generally, it introduces functions that permit a data owner to determine what security algorithms, for example hashing algorithms, may operate on his data or in the presence of his data. The approach taken may be used to cover various classes of algorithm, including but not limited to hashing algorithms, signature algorithms or encryption algorithms.

It will be appreciated that embodiments of the present invention may be applied to concentrate on the effects on a particular key (or other data) or algorithms that can be used to protect other keys, and the effects on all keys of restrictions on the algorithms available to protect keys. In particular, embodiments of the present invention concentrate on (1) restricting the choice of algorithms that can be used to protect any piece of data, and (2) indirectly protecting data via control over the algorithms that can be used to directly protect other data.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A trusted computing entity comprising:
a first operating environment in a physical computing platform and providing the trusted computing entity with a plurality of alternative sets of security algorithms for operating on data items; and
an interface adapted to communicate with a second operating environment and to identify one or more sets of trusted security algorithms that the second operating environment trusts for operating on data items,
the trusted computing entity being adapted to:
store a first record of security algorithms that the trusted computing entity has used in a current operating cycle of the trusted computing entity;
select a said trusted security algorithm from among the alternative sets and perform an operation using the selected trusted security algorithm on a said data item only if the first operating environment is compatible with the second operating environment; and
use the first record in a determination of whether the first operating environment is compatible with the second operating environment.

2. A trusted computing entity according to claim 1, wherein the entity is adapted to operate on a said data item only if the first operating environment provided by the entity has used only the trusted security algorithms to operate on other data items.

3. A trusted computing entity according to claim 1, wherein the entity is adapted to store a second record comprising associations between data items that have been operated on or generated by the entity, an indication of the security algorithm that was used to operate on or generate the data item, and an indication of the second operating environment that is associated with the data item.

4. A trusted computing entity according to claim 3, wherein the entity is adapted to operate on a said data item if the entity has used only the trusted security algorithms according to the second record.

5. A trusted computing entity according to claim 3, which is adapted, if it receives an indication that a certain security algorithm or set of security algorithms have become discredited, to identify from the second record indirectly tainted data items that are associated with a discredited security algorithm but which have not been operated on or generated using the discredited security algorithm.

6. A trusted computing entity according to claim 5, which is adapted to use the discredited algorithm to recover a said data item and use a trusted security algorithm to re-operate on or re-generate a replacement data item.

7. A trusted computing entity according to claim 3, which is adapted, if it receives an indication that a certain security algorithm or set of security algorithms have become discredited, to identify from the second record directly tainted data items that have been operated on or generated using the discredited security algorithm.

8. A trusted computing entity according to claim 7, which is adapted to use the discredited algorithm to recover a said data item, use a trusted security algorithm to re-operate on or re-generate a replacement data item and void the directly tainted data item.

9. A trusted computing entity according to claim 5, adapted to add the discredited security algorithm(s) to a list of algorithms that the entity will no longer use.

10. A trusted computing entity according to claim 1, wherein the entity is adapted to store a second record of any of the security algorithms that are provided by the entity but which will not be used.

11. A trusted computing entity according to claim 10, wherein the entity is adapted not to operate on a said data item using a security algorithm which is listed in the second record.

12. A trusted computing entity according to claim 1, wherein the operation is to protect the data.

13. A trusted computing entity according to claim 1, wherein the operation is to sign or encrypt the data.

14. A trusted computing entity according to claim 1, wherein the operation is a hash operation to produce a digest.

15. A trusted computing entity according to claim 1, wherein the data item is a cryptographic key.

16. A trusted computing entity according to claim 15, wherein the cryptographic key has an associated key description, which includes an indication of the second operating environment within which the key may be used.

17. A trusted computing entity according to claim 1, wherein the trusted entity comprises protected storage containing a storage root key.

18. A trusted computing platform comprising a trusted computing entity according to claim 1.

19. A trusted computing platform according to claim 18, wherein the trusted computing entity is at least logically protected from unauthorized modification.

20. A trusted computing platform according to claim 19, in which the trusted computing entity is a hardware trusted device.

21. A trusted computing platform according to claim 19, wherein the plurality of alternative sets of security algorithms includes a set of security algorithms sufficient for compliance with the Trusted Computing Group, TPM Specification, Version 1.2.

22. A method of processing a data item, the method comprising:
    associating the data item with a first operating environment;
    identifying one or more sets of trusted security algorithms that the first operating environment trusts for operating on data items associated with the first operating environment;
    the first operating environment requesting that a trusted entity in a physical computing platform perform an operation on the item of data; and
    operating the trusted entity in the physical computing platform to:
    store a first record of security algorithms that the trusted entity has used in a current operating cycle of the trusted entity; and
    select a security algorithm that the first operating environment trusts and perform the operation using the selected security algorithm on the data item only if a second operating environment of the trusted entity is compatible with the first operating environment of the data item, wherein the trusted entity uses the first record in determining whether the first operating environment is compatible.

23. The method of claim 22, wherein the second operating environment provides the trusted entity with a plurality of alternative sets of the security algorithms, and the trusted entity selects the selected security algorithm from among the security algorithms in the alternative sets.

24. A trusted computing entity, comprising:
    an operating environment implemented in a physical computer platform and providing a plurality of alternative sets of security algorithms;
    a list identifying items of data on which the trusted computing entity has used one or more of the security algorithms since the trusted computing entity has last booted, wherein for each of the items, the list indicates which of the sets of security algorithms were used on each item; and
    a history list indicating all of the security algorithms that the trusted computing entity used since the trusted computing entity last booted.

25. The trusted computing entity of claim 24, further comprising a forbidden list indicating which of the security algorithms the trusted computing entity must not use.

26. The trusted computing entity of claim 1, wherein the trusted entity is adapted to determine that the first operating environment is not compatible with the second operating environment in response to the first record containing a security algorithm that the second operating environment does not trust.

27. The method of claim 22, wherein the trusted entity determines that the first operating environment is not compatible with the second operating environment in response to the first record containing a security algorithm that the second operating environment does not trust.

* * * * *